United States Patent [19]

Carr

[11] Patent Number: 4,944,689
[45] Date of Patent: Jul. 31, 1990

[54] PANEL WIRING CONNECTOR

[75] Inventor: Owen R. Carr, Vancouver, Canada

[73] Assignee: Univ. of British Columbia, Vancouver, Canada

[21] Appl. No.: 379,209

[22] Filed: Jul. 13, 1989

[51] Int. Cl.⁵ .............................................. H01R 4/24
[52] U.S. Cl. .................... 439/417; 439/470; 439/569; 439/402
[58] Field of Search .................. 439/391–407, 439/417–419, 449, 450, 451, 452, 453, 455–463, 465–470, 472, 473, 569

[56] References Cited

U.S. PATENT DOCUMENTS

| | | | |
|---|---|---|---|
| 3,909,101 | 9/1975 | Bruels | 439/465 |
| 4,533,197 | 8/1985 | Prince | 439/404 |
| 4,533,201 | 8/1985 | Wasserlein, Jr. | 439/404 |
| 4,648,674 | 3/1987 | Sanchez | 439/449 |
| 4,778,405 | 10/1988 | Sterken | 439/395 |
| 4,822,297 | 4/1989 | Prince et al. | 439/404 |

Primary Examiner—David Pirlot

[57] ABSTRACT

A molded connector box for connecting electric power delivery wires to a panel (radiant heating) is formed with side walls and a bottom wall. A power wire inlet slot is formed through one side wall and an outlet slot through another side wall. Each slot has a power wire clamping fixture associated therewith. Blade type wire connectors are positioned adjacent to the inlet and outlet openings and a cooperating wire securing element is connected to its adjacent side wall via a strap in a position to be folded into the box and lock into its respective wire connector to hold the wires in the connector. A cover plate snaps into position to close the connector box.

6 Claims, 2 Drawing Sheets

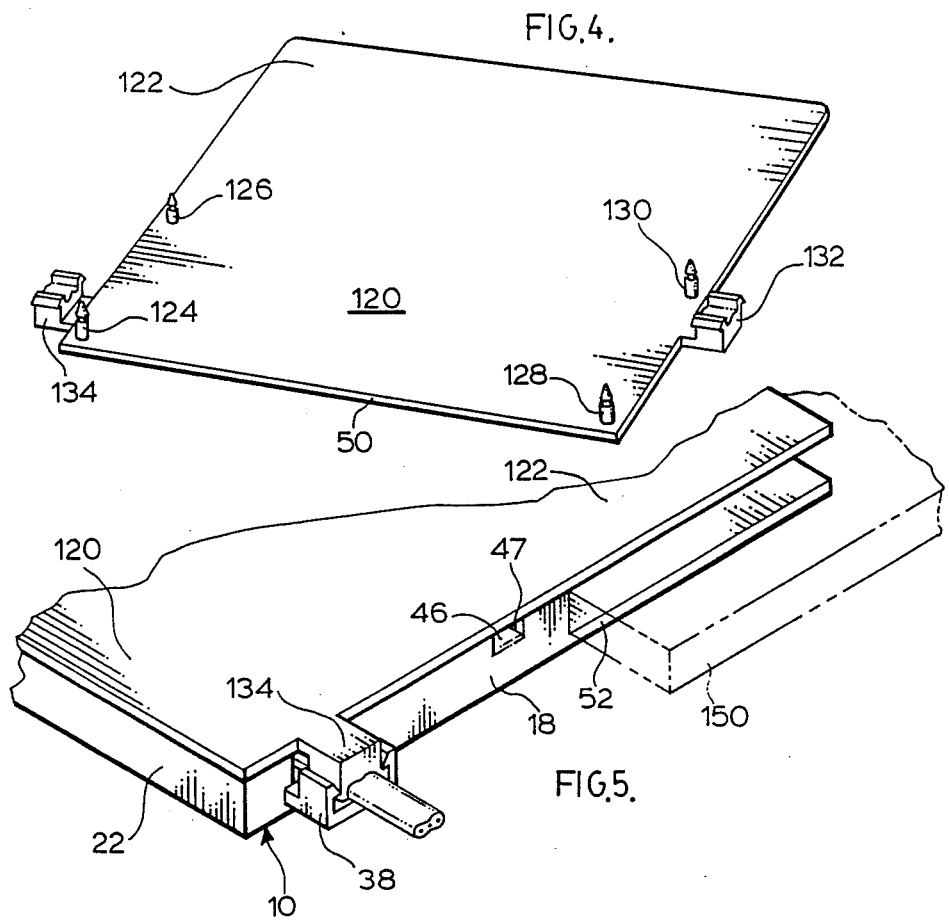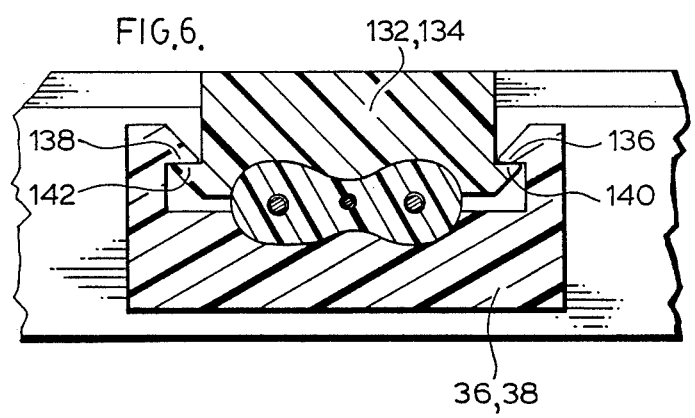

PANEL WIRING CONNECTOR

FIELD OF THE INVENTION

The present invention relates to a coupling box for connecting electric power delivery wires to connecting wires and is particularly adapted for electrically connecting electric resistance radiant heating panels to power wires.

BACKGROUND OF THE PRESENT INVENTION

A commercially used system for connecting electrical resistance radiant heating panel to the electric power lines simply brakes (cuts) the power line, uses a connector such as a conventional Mar connector to connect the positive lead to the heating element and uses a similar connector to connect the opposite end of the heating element to the negative lead form the power line. If the power line is to extend beyond the panel the positive and negative wires of the continuing power line are similarly connected to the incoming line using the same connectors as used to connect the heating element of the panel.

The ground wires in the incoming power and continuing lines using this system may or may not be reconnected (normally there is no ground wire associated with the heating element of the radiant panel.) In many cases the ground wire is simply removed from the wire sections bared to make the connections and is not reconnected.

To protect these connections a molded plastic tubular element having a pair of substantially axial extending flanges is used to encompass the ends of the incoming and continuing power lines and their connections with the heating element of the panel. The axial flanges are positioned one in face to face relationship with each of the major surfaces of the panel. The tubular portion housing the wires and connectors may be filled with a suitable insulating and binding material (which also is smeared on the flanges) to secure the wires in place in the tubular section and the tubular element to the panel.

BRIEF DESCRIPTION OF THE PRESENT INVENTION

It is an object of the present invention to provide a junction box for electrical wiring connecting a panel such as an electrical resistance radiant heating panel to a power line in a simple manner and to facilitate maintaining the continuity of the wiring.

Broadly the present invention comprises a molded junction box for connecting a heating panel to an electric power line, said box comprising an open ended cavity defined by a bottom wall and side walls, a first power line opening through a first one of said side walls, a second power line opening through a second one of said side walls, a first and a second wire clamping means associated with said first and said second power line openings, a pair of wire connectors in said cavity, one of said pair of connectors located adjacent said first wall and the other of said pair of connectors adjacent said second wall, each of said connectors opening toward an open end of said cavity, a cooperating wire connector closure means for each of said connectors, a strap for each said cooperating closure means, each said strap being integral with and connecting its closure means to its adjacent of said side walls, each said strap positioning its respective said closure means with respect to its respective wire connector so that each said closure means may be folded into said cavity and into closing relationship with its respective of said wire connectors.

Preferably said cavity will be substantially rectangular in cross section and said connectors will be positioned in diagonally opposed corners of said cavity and said first and said second power line openings will be positioned in a second pair of diagonally opposed corners of said cavity.

Preferably said junction box will be provided with a box cover having snap fastener means positioned to cooperate with mating snap fastener means on said box to lock said cover in closing position on said box.

The box cover preferably will further include cooperating clamping means positioned to cooperate with said wire clamping means to clamp a power line when said cover is in position closing said box.

Preferably a pair of ground wire posts project from said bottom wall and are positioned one adjacent to each wire connectors.

It is also preferred that said box have a mounting flange projecting from one side thereof and said box closure have a cooperating mounting flange, said flange and said cooperating flange being positioned in spaced parallel relationship when said box cover is mounted in closing relationship on said box to snugly receive therebetween a heating panel to which said box is to be connected.

BRIEF DESCRIPTION OF THE DRAWINGS

Further features, obJects and advantageous will be evident from the following detailed description of the preferred embodiments of the present invention taken in conjunction with the accompanying drawings, in which;

FIG. 4 is a inverted view of the box cover.

FIG. 5 illustrates the cooperating cover snapped into position closing the box, clamping the power wire and embracing a radiant heating panel between the mounting flanges.

FIG. 6 is section through the power wire clamp and cooperating clamping element on the cover.

DESCRIPTION OF THE PREFERRED EMBODIMENTS

Figure 1:
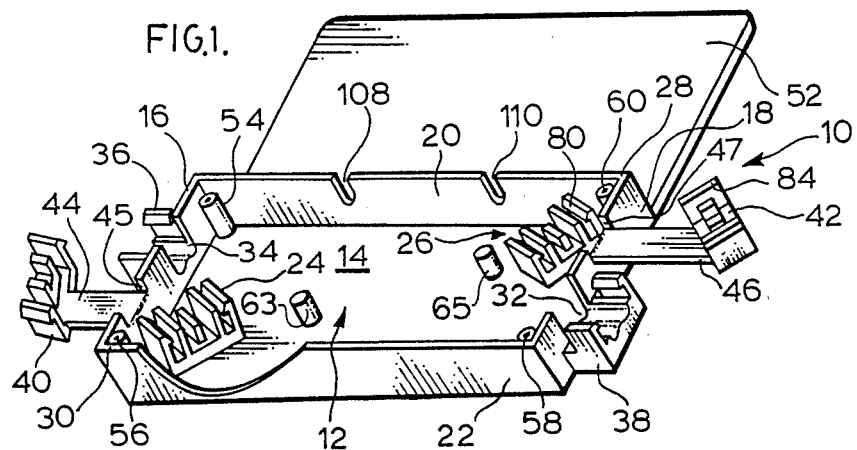
FIG. 1 is a schematic illustration of a wiring junction box incorporating the present invention.

As shown in FIG. 1 the wiring Junction box 10 is in the form of a cavity 12 defined by a bottom wall 14, a first pair of opposed side walls 16 and 18 and a second pair of opposed side walls 20 and 22. Mounted within the cavity 12 are a pair of blade type wire connectors 24 and 26. These connectors are positioned in a pair of diagonally opposed corners 28 and 30 of the box 10. Adjacent to the opposite corners of the box 10 are a pair of wire of power line openings or slots 32 and 34 respectively. Each slot 32 and 34 has associated with it a wire clamping element 36 and 38 respectively each such element being formed by being integrally molded with the body of the box 10 and, in the illustrated, arrangement projecting laterally outward from the walls 16 and 18 respectively. These elements 36 and 38 cooperate with cooperating clamping elements forming part of the cover 50 (see FIG. 4) to be described hereinbelow.

Projecting laterally outwardly from the side walls 16 and 18 are cooperating wire connector closures 40 and 42 for closing the connectors 24 and 26 respectively and locking wires in the connectors 24 and 26. Each of the closures 40 and 42 are connected to their respective adjacent side wall 16 and 18 via integral flexible straps 44 and 46 respectively. These straps 44 and 46 are joined to their respective side walls spaced between the bottom wall 14 and the top edge of the walls, and passages 45 and 47 are formed through the walls 16 and 18 between the connection of the straps 44 and 46 to their respective walls and the top edge of the respective walls to which they are attached thereby to provide passages through which the straps 44 and 46 may pass into the cavity 12. The length of these straps 44 and 46 between the wall 16 or 18 and the closure 40 and 42 respectively is coordinated with the location of the connector 24 or 26 with which the closure is to cooperate so that folding of the cooperating elements 40 and 42 into the cavity 12 moves these cooperating elements into overlying and locking relationship with their respective connectors 24 and 26 as will be described in more detail below. The folding of these cooperating clamping elements 40 and 42 into position is schematically illustrated by the arrows 48 in FIG. 2.

A laterally projecting mounting flange 52 extends outwardly from the side wall 20 and in the illustrated arrangement is a projection of the bottom wall 14.

A suitable latching element is formed in each corner of the box 10 by hollow corner posts 54, 56, 58 and 60. The posts are each adapted to receive a mating male member on the cover 50 in a snap fit to secure the cover 50 on the box 10 and close the cavity 12 as will be described below.

A pair of ground wire posts 63 and 65 extend upward from the bottom wall into the cavity 12 and preferably will be substantially the same height as the side walls 16, 18, 20 and 22. These posts preferably will be located one adjacent to each of the connectors 24 and 26.

Figure 3:
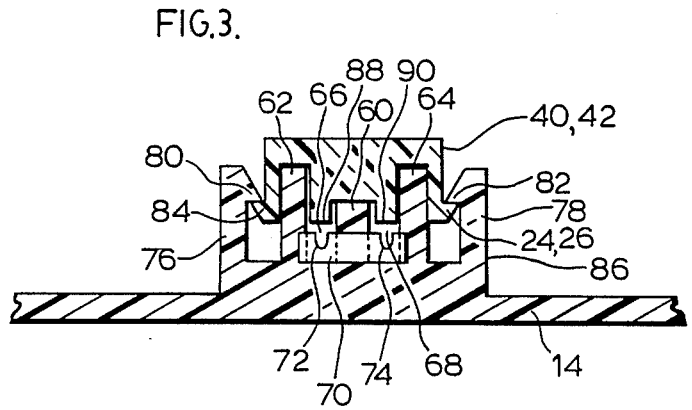
FIG. 3 is a cross section through one of the wiring connectors showing the cooperating closure member folded into locking position to lock the wires in place.

The connectors 24 and 26 are essentially the same and simulate commercially available connectors. Such a connector is shown in FIG. 3 as connector 24 or 26. As illustrated in FIG. 3 the connector 24 or 26 is molded integral with the box 10 and thus is directly connected as part of the bottom wall 14 and is shown with its respective cooperating connector closure 40, 42 in locking relationship therewith. Each of the connector 24 and 26 has a centre partition 60 and a pair of isolating partitions 62 and 64 spaced one on each opposite side of the centre partition 60 to define therebetween passages 66 and 68 respectively through which wires to be connected pass. A blade like connector 70 extends between the isolating partitions 62 and 64 through the central partition 60 and is formed with sharp edged slots 72 and 74 located in the passages 66 and 68 respectively into each of which a wire to be connected is forced. Forcing the wire into the slots 72 or 74 causes the edges of the slots to cut through the insulation surrounding the conducting wire and make direct contact between the conducting wire and the blade 70. The blade 70 thus interconnects wires forced into the slots 72 and 74.

Outside of the isolating partitions 62 and 64 are upstanding latching posts 76 and 78 respectively having undercut latching projections 80 and 32 respectively.

Cooperating wire connector closure elements 40 and 42 as illustrated in FIG. 3 are provided with undercut latching projections 84 and 86 that engage with the projections 80 and 82 respectively to lock the elements 40 and 42 in position closing the open end of the connectors 24 and 26 respectively.

Preferably the cooperating closure elements 40 and 42 will be shaped to match with the cross section of the connector 24 or 26 with which it is to mate and in particular will be provided with projections 88 and 90 that fit within the passages 66 and 68 and prevent the wires from moving out of the slots 72 and 74 and becoming disconnected from the blade 70.

Figure 2:
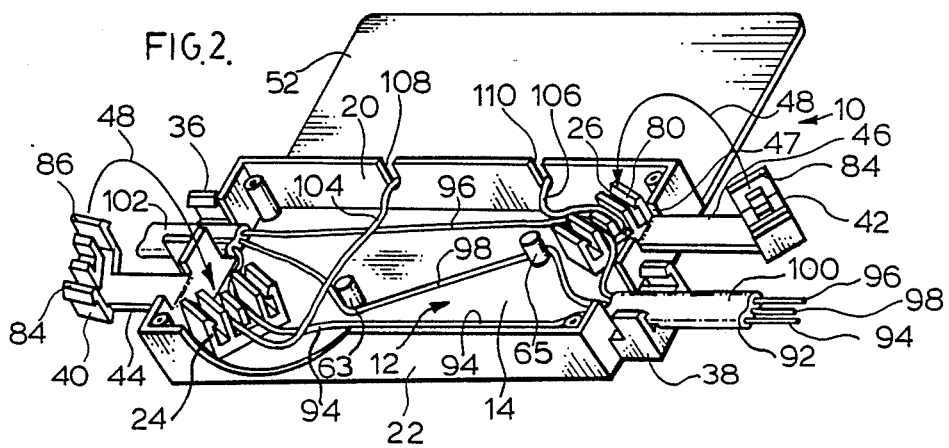
FIG. 2 is a view similar to FIG. 1 showing the wiring in place in the junction box.

FIG. 2 illustrates the preferred manner in which the power and connecting wires and ground wire will be arranged in the box 10. A length of a power line 100 having power carrying wires 94 and 96 and a ground wire 98 is stripped of the insulation surrounding all the wire while leaving intact the discrete insulation surrounding the power wires 94 and 96 between an incoming section 92 entering the box 10 through slot 32 and an outgoing section 102 passing from the box 10 through slot 34. The wire 96 is led through the connector 26 and forced into one of the slots 72 or 74 of the connector 26 and passes to the outlet portion 102 and the wire 94 is led to the connector 24 and forced into one of the slot 72 or 74 of the connector 24 and then passes to the portion 102. The bare ground wire 98 is wrapped around the posts 65 and 63 to extend in a zig-zag path across the box 10 from the portion 92 to the portion 102 of the wire 100.

The wires from the heating element of panel (not shown in FIG. 2) are indicated at 104 and 106. The wire 106 leading from one side of the panel heating element (not shown) passes into the box 10 through the slot 108 in the side wall 20 and is forced into the other of the slots 72 and 74 of the connector 24 to connect the wires 94 and 104. The other wire 106 passes into the box 10 through the slot 110 in the wall 20 and is connected to the wire 96 through the blade 70 in the connector 26 in a similar manner to the connection between the wires 104 and 94.

When the wires are all in place for each of the connectors 24 or 26 the connector, closures 40 and 42 are folded into position and locked to their respective connector 24 or 26 to lock the wires in the connectors.

The cover 50 is used to close the cavity 12. The cover 50 is in the form of essentially a flat plate having a cover forming portion 120 and a laterally extending mounting flange portion 122. Upstanding male latching members 124, 126, 128 and 130 are positioned and formed to be received in and cooperate with the cavities in the corner post 54, 56, 58 and 60 in the box 10 to lock the cover 50 to the box 10 and close the cavity 12.

Cooperating clamping elements 132 and 134 extend from a pair of opposite sides respectively of the portion 120 of the cover 50 in a position to cooperate with the clamping elements 36 and 38 on the box 10 when the cover 50 is in position closing the cavity 12.

The cover 50 is inverted from the position shown in FIG. 4 and forced onto the box 10 as indicated in FIG. 5 with the male members 124, 126, 128 and 130 received in the hollow posts 58, 60, 56 and 58 respectively to lock the cover 50 to the box 10. The cooperating clamping element 134 mates with the clamping element 38 on the box 10 and the element 132 similarly mates with the clamp 36 to clamp the wire porions 92 and 102 respectively to the box 10.

A shown in FIG. 6 the clamping elements 36 and 38 are each provided with undercut latches the cooperate with mating undercut latches 140 and 142 respectively on the mating clamping elements 132 and 134 to lock the clamps closed and secure the wire passing therethrough.

Referring again to FIG. 5 it will be noted that the heating panel 150 indicated by the dot dash lines is snugly received between the mounting flanges 52 on the box 10 and 122 on the cover 50 to hold the box 10 to the panel 150. If desired suitable adhesive may be used or other fastening means used to connect the flanges 52 and 122 to the panel 150.

Having described the invention modifications will be evident to those skilled in the art without departing from the spirit of the invention as defined in the appended claims.

I claim:

1. A molded junction box for connecting a heating panel to an electric power line, said box comprising an open ended cavity defined by a bottom wall and side walls, a first power line opening through a first one of said side walls, a second power line opening through a second one of said side walls, a first and a second wire clamping means associated with said first and said second power line openings, a pair of wire connectors in said cavity, one of said pair of wire connectors located adjacent said first wall and the other of said pair of wire connectors adjacent said second wall, each of said wire connectors opening toward an open end of said cavity, a cooperating wire connector closure means for each of said wire connectors, each said cooperating connector closure means having a strap integral with and connecting said closure means to its adjacent of said side walls, each said strap positioning its respective said closure means with respect to its respective said wire connector so that each said closure means may be folded into said cavity and into closing relationship with its respective wire connector, a box cover means having snap fastener means positioned to cooperate with mating snap fastener means on said box to lock said cover in a closing position on said box, a mounting flange projecting from one side of said box, a cooperating mounting flange projecting from said box cover means, said flange and said cooperating flange being positioned in spaced parallel relationship when said box cover means is mounted in closing relationship on said box to snugly receive a heating panel to which said box is to be connected between said mounting flange and said cooperating mounting flange.

2. A junction box as defined in claim 1 wherein said cover further includes cooperating clamping means positioned to cooperate with said wire clamping means to clamp a power line when said cover is in position closing said box.

3. A junction box as defined in claim 1 further comprising a pair of ground wire posts projecting from said bottom wall, said post being positioned one adjacent to each of said wire connectors.

4. A junction box as defined in claim 1 further comprising a pair of ground wire posts projecting from said bottom wall, said post being positioned one adjacent to each of said wire connectors.

5. A junction box as defined in claim 1 wherein said cavity is substantially rectangular in cross section and said connectors are positioned in diagonally opposed corners of said cavity and said first and said second power line openings are positioned in a second pair of diagonally opposed corners of said cavity.

6. A junction box as defined in claim 5 further comprising a pair of ground wire posts projecting from said bottom wall, said post being positioned one adjacent to each of said wire connectors.

* * * * *